United States Patent
Osecky et al.

(10) Patent No.: US 7,584,405 B2
(45) Date of Patent: Sep. 1, 2009

(54) FAULT-DETECTING COMPUTER SYSTEM

(75) Inventors: Benjamin Daniel Osecky, Fort Collins, CO (US); Blaine Douglas Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1192 days.

(21) Appl. No.: 10/726,976

(22) Filed: Dec. 3, 2003

(65) Prior Publication Data

US 2005/0138485 A1  Jun. 23, 2005

(51) Int. Cl.
*G06F 11/00* (2006.01)
(52) U.S. Cl. .................. 714/784; 717/138; 717/175; 712/24; 707/200; 707/8
(58) Field of Classification Search ............... 714/784
See application file for complete search history.

(56) References Cited

U.S. PATENT DOCUMENTS

| | | | | |
|---|---|---|---|---|
| 5,537,559 A * | 7/1996 | Kane et al. | ............... | 712/244 |
| 5,594,903 A * | 1/1997 | Bunnell et al. | ............... | 717/162 |
| 6,862,609 B2 * | 3/2005 | Merkey | ............... | 709/214 |
| 6,880,112 B2 * | 4/2005 | Lajolo | ............... | 714/42 |
| 7,043,728 B1 * | 5/2006 | Galpin | ............... | 718/102 |
| 7,110,431 B2 * | 9/2006 | Oates | ............... | 375/130 |
| 7,168,008 B2 * | 1/2007 | de Bonet | ............... | 714/38 |

FOREIGN PATENT DOCUMENTS

| | | |
|---|---|---|
| JP | S60-198645 | 10/1985 |
| JP | S62-293441 | 12/1987 |
| JP | H10-011309 | 1/1998 |
| JP | 2003-316599 | 7/2003 |

OTHER PUBLICATIONS

English Translation of Japanese Office Action Dated Apr. 4, 2007 for application 2004-349450.
English Translation of Japanese Office Action Dated Nov. 22, 2006 for application 2004-349450.

* cited by examiner

*Primary Examiner*—M. Mujtaba K Chaudry
*Assistant Examiner*—Enam Ahmed (57) ABSTRACT

A method for detecting computational errors in a digital processor executing a program. Initially, the program is divided into computation segments, and source code for at least one of the segments is compiled to generate two redundant code sections. Comparison code is generated for comparing results produced by execution of the two code sections. Each of the code sections is then executed in a different computational domain to generate respective results. The results of the computation are executed to alter further flow of the program only if the respective results are identical.

36 Claims, 4 Drawing Sheets

FAULT-DETECTING COMPUTER SYSTEM

BACKGROUND

Two classes of hardware-related errors are considered to occur in computational systems: hard errors and soft errors. A hard error is manifested as an improper behavior of the operation of a computer system that persists and continues to cause the system to produce improper behavior and results for a significant period after an initial error occurs. A soft error is a non-recurring error generated by a temporary anomaly in a computer hardware device. Soft errors involve an improper behavior of the computer system that does not persist beyond a certain period of time. After this time has elapsed further operation of the system proceeds normally.

As the physical devices that make up computer systems have become smaller and more numerous, many recurring physical phenomena are now more likely to cause temporary faults in the operation of these devices resulting in the disruption of the operation of the digital logic and state making up a computing system, often resulting in soft errors. Soft errors are generally more difficult to detect than hard errors. Soft errors are assumed to be more frequent than hard errors and are also assumed to occur sufficiently often that their effect should be considered in computer systems design. Undetected soft errors can result in incorrect results being reported as the result of a computation, corrupt data being stored to disk or other persistent media, or transmitted over network connections, or result in anomalous behavior of a program or of the entire computer system. It is desirable to provide error detection coverage for the subsystems of the computer system architecture which have the highest error rates using techniques which provide detection of soft errors and, optionally, of hard errors. These subsystems typically include the system main memory, the various levels of processor caches as well as system TLB (translation lookaside buffers), I/O and interconnection 'fabric'. When an error is detected it is often desirable to provide a way of correcting the error so that the computation can continue to produce a correct result. If an error occurs in one of these subsystems, the error will be detected and corrected before it is delivered to other subsystems, thereby obviating the need for the error to be addressed by the other subsystems. This leaves the uncovered subsystems to be addressed. In many computer system designs large portions of the central processing unit are not covered by error detection or error correction.

With the continuing development of VLSI processors having ever-increasing component density, the susceptibility of these processors to 'soft' errors caused by sources such as cosmic rays and alpha particles is becoming an issue in the design of computational systems. Error detecting and correcting codes are widely applied to the design of computer system memory, caches and interconnection fabric to verify correct operation and to provide correction of the representation of data in the event that either soft or hard errors occur. Protecting the processor electronics is a more difficult task since a processor has many more structures of greater complexity and variety than computer memory devices. Existing hardware techniques for protecting the processor electronics require the design and incorporation of significant logical structures to check, contain and recover from errors which might occur in the core structures that make up the processor.

Other processor-oriented error detection techniques have included providing multiple processors running the same instructions in 'lock step' and associated self-checking hardware to verify that all results visible externally from each processor match the results of each (or a majority) of its peers to ensure correct operation. In implementation of these techniques where the comparisons do not match, additional complexity is required to limit the propagation of any erroneous state. In addition, special procedures must be performed to either rule the result of the computation as invalid or to recover the state of the computation. All of this adds to the cost and complexity of the system design.

Software techniques have also been proposed to address errors in computation. Some of these techniques involve fully executing a program multiple times and comparing the results, and then re-executing the computation until the results match. All of the above techniques multiply the computing resources and time required for a computation to complete. Furthermore, some of these techniques will not detect certain classes of hard errors. Other software fault tolerance techniques assume that a computation will fail in such a way that the computation will stop or 'fail fast', or that errors will be detected by error exception checking logic normally incorporated in processor designs. These techniques often provide inadequate coverage of soft errors.

From the foregoing, it can be seen that methods for detecting improper operation of computer systems often require extensive hardware and software to support the detection of improper operation, to minimize damage resulting from incorrect results due to improper operation, and also to minimize the number and extent of special actions needed to recover and continue processing in the face of a detected fault. Such systems have often employed doubly or triply redundant hardware and extensive checking and correction logic beyond that required for the basic computation environment itself. Alternative software fault tolerance techniques typically require the adoption of specialized programming techniques which can impact the design of system and applications software, or which require multiple executions of a program and subsequent comparison of the results of two or more program executions.

The implementation of existing techniques for detecting soft errors, either hardware- or software-based, thus requires significant additional hardware, software, and/or other resources.

SUMMARY

A system is disclosed for detecting computational errors in a digital processor executing a program. Initially, the program is divided into computation segments, and source code for at least one of the segments is compiled to generate two redundant code sections. Comparison code is also generated for comparing results produced by execution of the two code sections. Each of the code sections is then executed in a different computational domain to generate respective results. The results of the computation are executed to alter further flow of the program only if the respective results are identical.

DETAILED DESCRIPTION

Related systems of software techniques for detection of digital processor-related errors are described herein. When combined with existing computer architectures, these systems provide effective fault detection coverage for a processor. The term 'processor' is used in this document to refer to central processing units ('CPU's) as well as digital processors providing other types of functionality. The fault detection techniques described herein may also be used to provide efficient recovery from detected fault conditions. In exemplary embodiments, the techniques may be employed without requiring modifications to the architecture, structure, or source code of applications programs.

Figure 1:
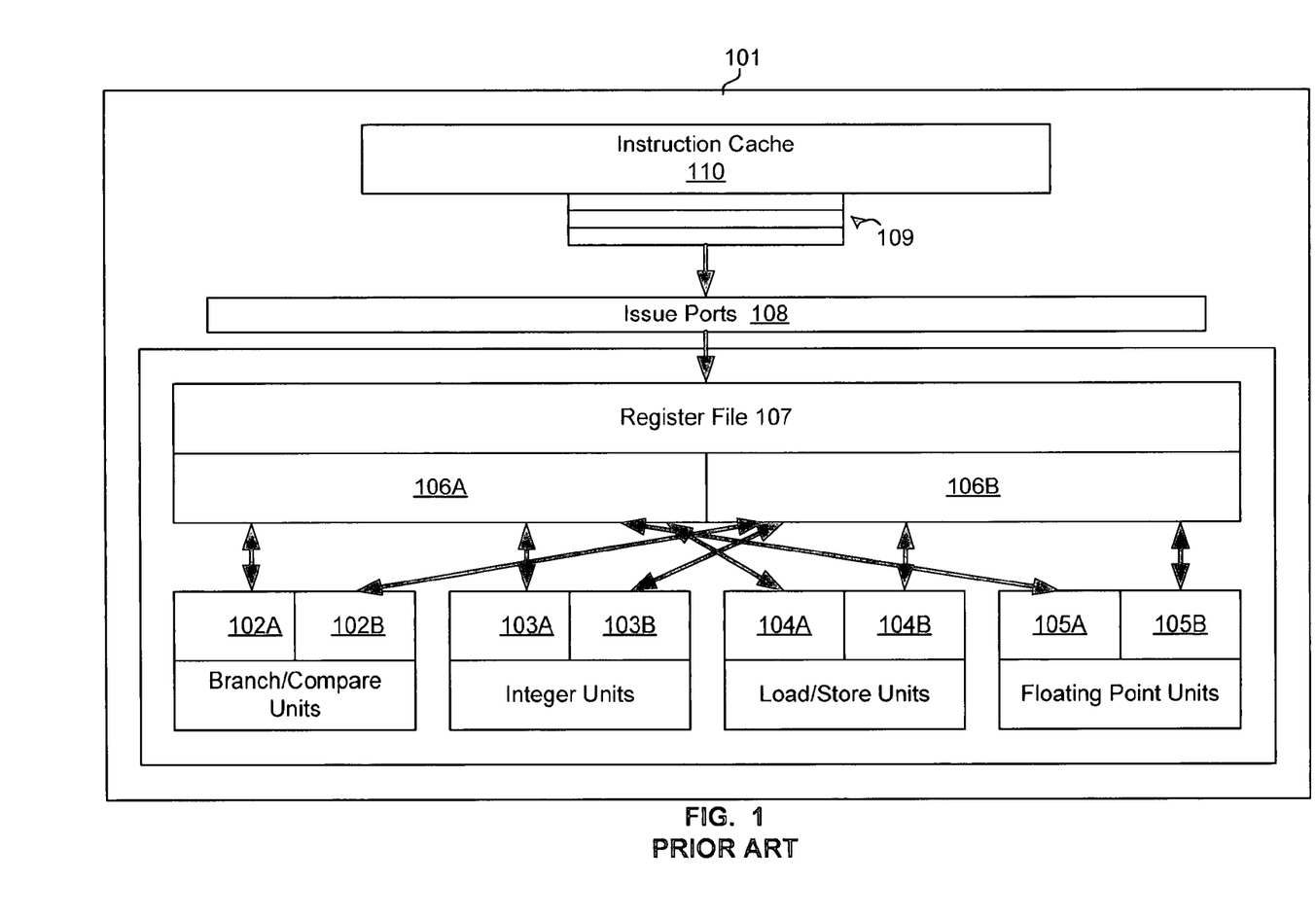
FIG. 1 is a diagram showing certain components of an exemplary VLIW processor (prior art)

FIG. 1 is a block diagram of relevant sections of an exemplary VLIW (Very Long [or Large] Instruction Word) processor 101, such as a Intel Itanium II, that is suitable for use in the present system. VLIW describes an instruction-set philosophy in which a compiler packs a number of basic, non-interdependent operations into the same instruction word. When fetched from cache or memory into the processor, these fixed-length words (instructions) are broken up into several shorter-length instructions which are dispatched to independent functional units (also known as 'execution units'), where they are executed in parallel. In the processor shown in FIG. 1, instructions in instruction cache 110 are queued in instruction queue 109, issued via issue ports 108, and executed via functional units 102-105 using associated registers 106A/106B, described below.

Processor 101 includes two branch/compare units 102A/102B, two integer units 103A/103B, two load/store units 104A1 04B, and two floating point units 105A/105B. Each of the functional units has a corresponding register or register set, which is partitioned into two corresponding but separate parts as indicated by partitions 106A and 106B. The two groups of registers 106A/106B are collectively referred to as a 'register file' 107. The present system is capable of functioning without the parallel branch/compare unit 102B, but the examples shown herein assume that two compare units 102A/B are available on processor 101. The use of partitioned registers allows the detection and repair of errors in register file 107 or paths to/from the register file. The present system includes encoding of different register names into redundant instructions (e.g., load, store, compare) to utilize these partitioned registers.

Temporal Replication

Soft errors that affect a processor are primarily a result of physical phenomena (e.g., alpha particles and cosmic rays) which are observed to occur randomly but which have some average rate of occurrence and a probability distribution of event durations during which a system behaves incorrectly, or during which the state of the system is altered. Furthermore, the disruptions are generally confined to a single active device or a cluster of physically adjacent devices on a VLSI chip. The observation can be made that the mean time between occurrences of these events is much greater than the maximum duration of disruption. Furthermore, the probability that the same circuit will be disrupted in the same way by a second event after the effects of the first event have ended is also extremely small; as a result, the possibility of two independent identical sequential errors occurring in the same computation units close together in time can be neglected. Therefore, the technique of temporal replication can be used to create multiple computing domains that can be employed to verify that the computation has not been disrupted in a significant way by a soft error.

From the probability distribution of event durations, a maximum period of disruption, Dmax, can be identified such that the probability that an event duration will be longer than Dmax is small enough that longer durations need not be considered. The average maximum duration of disruptive events due to cosmic rays, alpha particles and other randomly occurring disruptive phenomena dictates a value for Dmax equal to some predeterminable number of processor clock cycles. The duration of these disruptive events is a function of the particle type and energy along with the properties of the semiconductor processes and design of the devices on the processor chip. Therefore, the actual value for Dmax may be determined for any real processor design. The applicable value for Dmax for a particular processor may be determined by detailed simulation of the soft error causes as part of the design processes, determined by measurement of populations of actual devices that make up the processor, or determined through accelerated error rate measurement techniques. For example, for processors with clock frequencies of approximately 1 gigahertz, Dmax may have a value of several CPU clock cycles.

Figure 2:
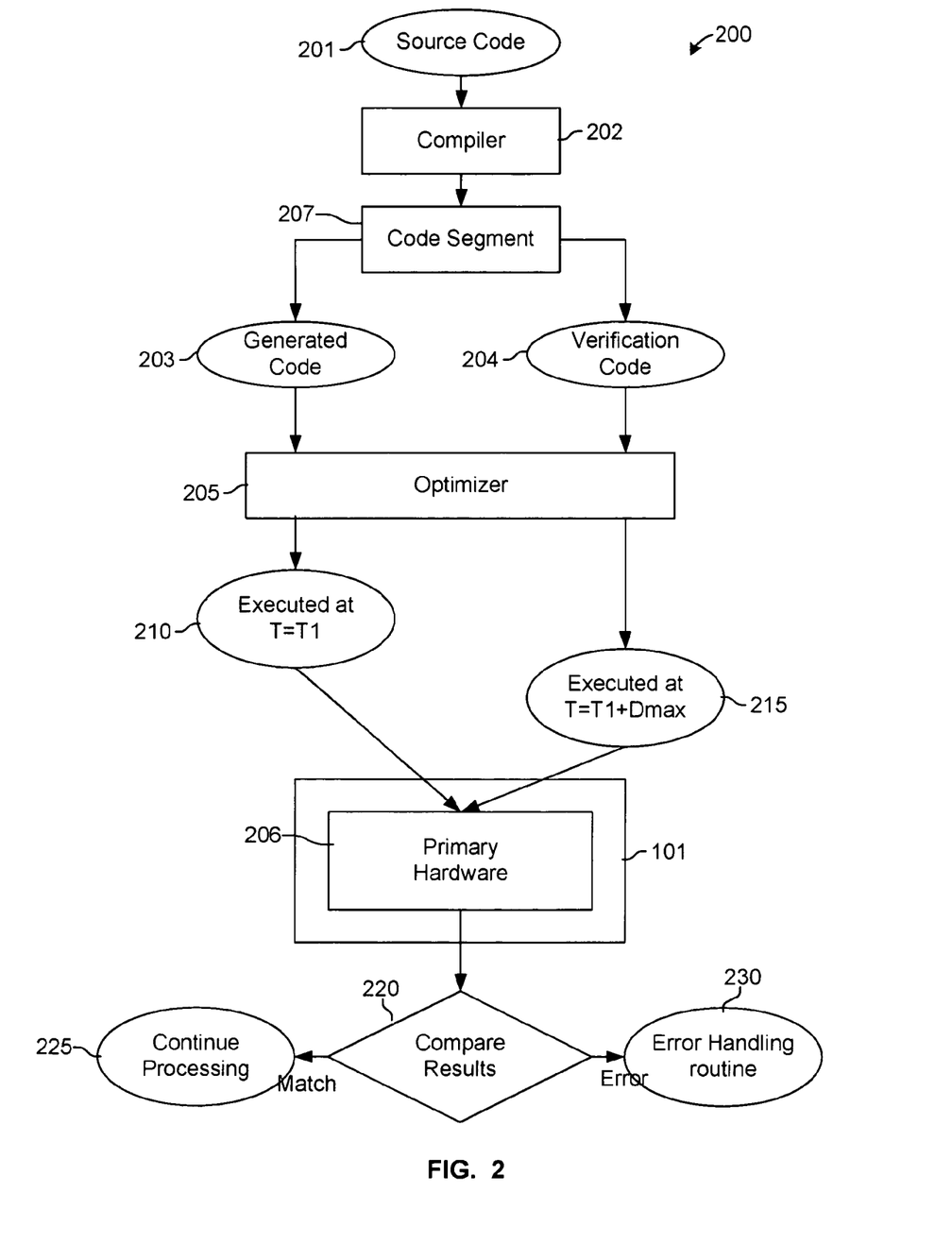
FIG. 2 is a diagram showing exemplary components and process flow for a temporal replication fault detection system.

FIG. 2 is a diagram showing exemplary components and process flow for a temporal replication fault detection system 200. As shown in FIG. 2, the source code 201 for a program of interest is separated into computation segments 207 by compiler 202 based on a model wherein each segment takes a set of inputs, performs computations on the input values, and exposes a set of outputs to further computation. Each code segment is processed by compiler 202 and the resultant generated code 203 is passed to an optimizer 205, which schedules the execution of operations in order to best make use of a particular processor's available resources.

The present method requires no significant modifications to be implemented in a typical compiler prior to the code generation phase. One possible modification comprises the processing of a compiler flag to turn error checking on or off. In the code generation phase (which follows the source code parsing phase), compiler 202 reads an intermediate encoding of the program semantics and performs standard operations including allocating space and resources on the object computer, such as assigning addresses to identifiers and temporaries. In addition to these operations performed by typical compilers, compiler 202 also generates code for operations that allocate and reallocate resources (such as registers), to hold temporary values.

The code generation phase of compiler 202 is modified to generate error handling code 204 which verifies the correct operation of each segment of the program as it is executed. The resources of processor 101 are used in such a manner that the redundant and checking computations are each performed in a different computational domain from the domain performing the initial computation. The error handling code 204 generated by compiler 202 is further structured so that an appropriate action for error containment is taken, and, in an alternative embodiment, recovery action is initiated upon detection of an error.

Present processors typically incorporate multiple execution units in their design to improve processor performance. Multiple, or redundant, execution units are typically present in both multiple issue architectures such as HPPA ('Hewlett-Packard Precision Architecture') or SPARC (Scalar Processor ARChitecture), and also in VLIW architectures such as EPIC IPF ('Explicitly Parallel Instruction Computer Itanium Processor Family'). Frequently, the execution units are not fully utilized due to serialization with I/O and memory operations. As a result, it is often possible to schedule the execution of redundant checking calculations without significant impact on program execution time. Control over the scheduling of these resources is typically not provided in multiple issue architectures and may not be explicit in the case of some VLIW designs; therefore, resource scheduling is performed by optimizer 205. Optimizer 205 reorders the code and schedules the execution of operations in order to best make use of a processor's available resources, such as functional units, timings and latencies.

In the present temporal replication method, optimizer 205 schedules execution of redundant code sections 210/215 so that a minimum number of clock cycles (i.e., a minimum amount of time) will elapse between the execution of primary copy 210 and secondary copy 215 of a particular segment of compiled source code. The order of execution of the copies is not important as long as the time between the use of the same hardware resource 206 by the primary/secondary pair of code sections 210/215 is greater than some delta, e.g., Dmax. Given that Dmax is known at the time a program is being compiled to run on a certain processor, compiler 202 in the present system 200 ensures that each section of code 215 that performs the redundant calculations and checking is executed at least Dmax processor cycles apart from the section of code 210 that performs the initial calculation/checking. Optimizer 205 may insert no-ops ('Nops') or schedule other operations between the two sections of code 210/215 to ensure proper spacing of the execution in time.

In an alternative embodiment, a mechanism is provided to incorporate the length of time corresponding to Dmax in a way that can be interrogated by programs running on processor 101. For example, the value of Dmax may be used by these programs (other than compiler 202), to time skew the execution of redundant threads accordingly to allow for an amount of wait time approximately equal to Dmax.

The compiled code shown in Table 1 below is an example showing how the operation A+B=C might be performed on an exemplary VLIW processor, such as processor 101. In the example shown in Table 1, the VLIW processor allows a five operations per cycle in its instruction word; only one branch/compare unit is shown. The instructions shown in each row in Table 1 are issued every clock cycle unless the processor stalls waiting for an operand. In the example below, 'BRUnit' is a branch/compare unit (102A/102B), 'ALU/cmpU' is an integer unit (103A/103B), 'Load/storeU' is a load/store unit (104A/104B), and R1-R3 are registers (106A/106B). The VLIW processor characteristics indicated above are also applicable to all subsequent examples set forth below.

TABLE 1

| Cycle | BRU | ALU/cmpU | Load/storeU | ALU/cmpU | Load/storeU |
|---|---|---|---|---|---|
| (1) | Nop | Nop | Load R1 = A | Nop | Load R2 = B |
| (2) | Nop | Nop | Nop | Nop | Nop |
| (3) | Nop | Nop | Nop | Add R3 = R1 + R2 | NoP |
| (4) | Nop | Nop | Nop | Store R3, C | Nop |

Although the above processor is capable of parallelism, there are still a number of Nops in the compiled code shown above. Compiler 202 may include code to schedule instructions in the available slots and issue pre-fetches, etc., in order to increase performance by scheduling more operations per cycle and by reducing latency.

The compiled and optimized code shown in Table 2 below is an example of the present method of temporal replication for performing the A+B=C operation shown in Table 1. As shown in Table 2, the operation of loading registers R1 and R2 with values of A and B, respectively, is first performed in clock cycle 1, and is repeated at a later time using the same registers in clock cycle 4. The result of the first addition operation is saved in register R3 in cycle 2 and compared by verification code 204, at step 220, against the result of the second addition operation (stored in register R4 in cycle 5). If the values stored in registers R3 and R4 are not equal, a branch to an error handling routine 230 is taken, otherwise, processing continues with the next segment of code at step 225. Compiler 202 breaks the program into segments 207 so that checking of the results of the two operations are checked before the results are 'exposed', or used to alter the further flow of execution of the program.

Results may be exposed by writing them to an I/O device, or by writing them to a memory area that might be seen by another process or processor or executing a conditional branch which may or may not alter the flow of control in the program. If error recovery is to be implemented, an additional constraint on a segment 207 is that a segment does not destroy its inputs until checking is successfully completed.

Optimizer 205 may allow code from adjacent computation segments for executing other program statements to overlap the execution and checking code for a segment such as described in Table 2, provided that the temporal redundancy of each statement is individually maintained and ordering is maintained so that results are exposed in program order and only after the checking sequences for each statement have been successfully executed.

Error handling routine 230 may provide for retrying an erroneous operation a predetermined number of times, or, alternatively, may cause a fault or take other action in lieu of retrying the operation.

In the example shown in Table 2, Nops have been inserted into clock cycle 3 by compiler 202. The number of clock cycles that are placed between the execution of the primary copy 210 and the secondary copy 215 of the segment of compiled code is a function of the value of Dmax for a particular processor, as explained above. In the Table 2 example, registers R1-R4 correspond to registers in register file 106A/106B in FIG. 1, and 'Error' is the label of error-handling routine 230. The code shown in Table 2 has been compiled/optimized for a Dmax of 3 cycles; that is, there are three clock cycles between the execution of redundant code sections. For example, the first 'Load R1=A' operation has been compiled to execute during clock cycle (1), and the redundant execution of this same operation has been compiled to execute 3 cycles later, during clock cycle (4).

TABLE 2

| Cycle | BRUnit | ALU/cmpU | Load/storeU | ALU/cmpU | Load/storeU |
|---|---|---|---|---|---|
| (1) | Nop | Nop | Load R1 = A | Nop | Load R2 = B |
| (2) | Nop | Add R3 = R1 + R2 | Nop | Nop | Nop |
| (3) | Nop | Nop | Nop | Nop | Nop |
| (4) | Nop | Nop | Load R1 = A | Nop | Load R2 = B |
| (5) | Nop | Add R4 = R1 + R2 | Nop | Nop | Store R3, C |
| (6) | Nop | Comp R4, R3 | Nop | Nop | Nop |
| (7) | BNE Error | | | | |
| Label Error: //Retry and error handling routine | | | | | |

Error Handling

The present system performs one or more checks, as indicated by decision block 220 in FIG. 2 (and by block 320 in FIG. 3), to ensure that the results of computations performed for a code section in two independent computation domains (i.e., temporal or spatial domains) are identical prior to exposing the code to further computation, or before using the result to direct a branch operation. This can be done both before and after the branch is actually taken in order to provide opportunities for optimization by optimizer 205.

In the case that a mismatch is found between the redundant computations the program will branch to error handling code 230. Recovery may be as simple as indicating an error and terminating the execution of the program ('fail fast'). This technique may be adequate if other levels of recovery are provided by the system. Alternatively, the program may be restarted from the beginning, although this procedure may not be acceptable in some kinds of interactive applications.

In a more comprehensive recovery procedure, the last program segment is re-executed. Since no computed values are exposed until all computations are checked, a program stage, or segment, that produces an erroneous result may be safely re-executed from the beginning to recover from an error. In an alternative embodiment, a flag is set, indicating that an error recovery operation is in progress. This flag is cleared if the stage of the computation completes successfully. If a second error is encountered in attempting to execute this stage of the program, an indication will be given that a hard error has been encountered.

A further alternative error handling technique includes structuring a program so that the results are computed three or more times on different domains, wherein the program code is structured so that the computed results delivered by the majority of the computational domains is exposed as the result of execution of a particular segment of the code. Note that any of these methods may be selectively used on only the code needing this level of protection.

Spatial Replication

Figure 3:
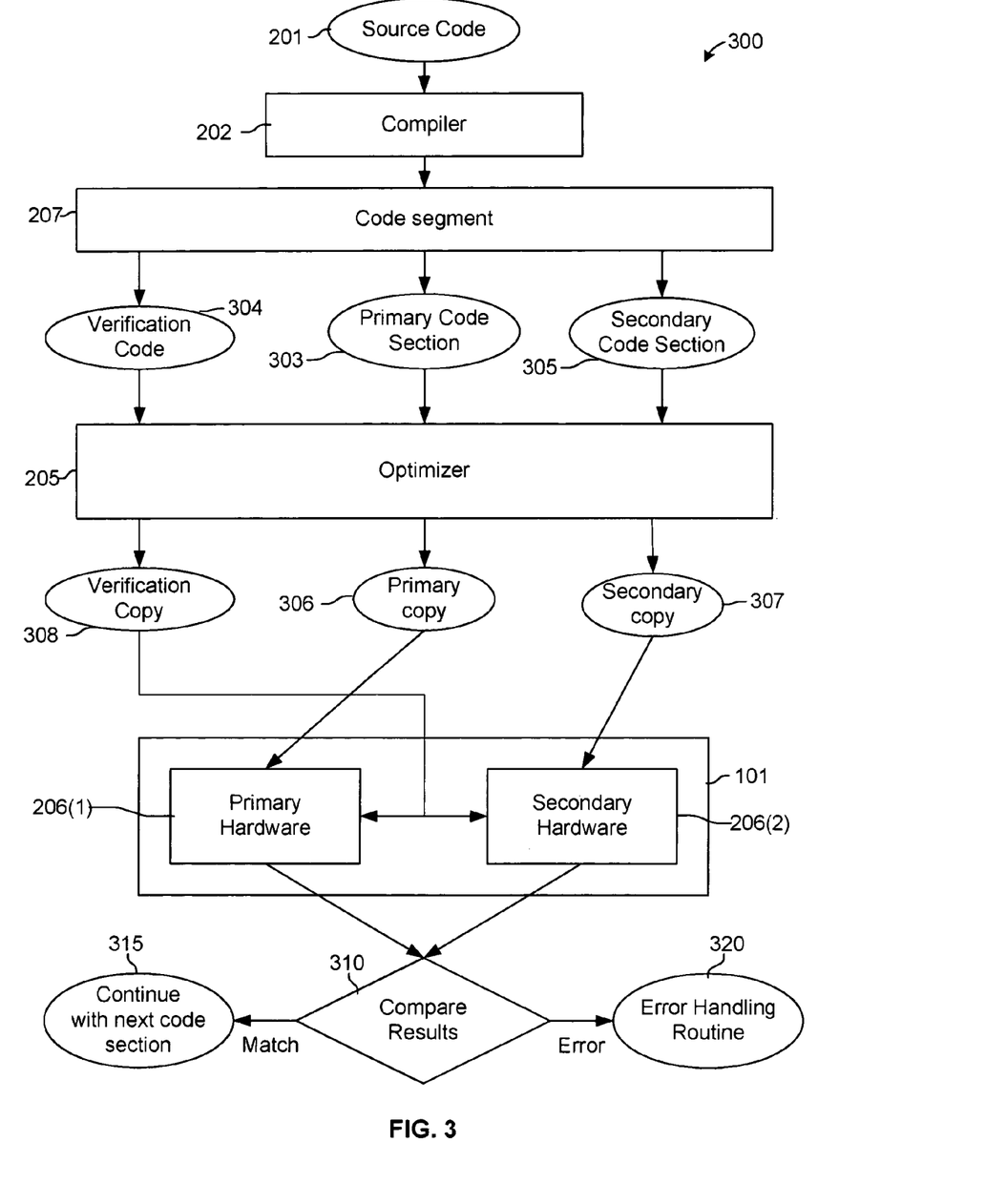
FIG. 3 is a diagram showing exemplary components and process flow for a spatial replication fault detection system.

FIG. 3 is a diagram showing exemplary components and process flow for a spatial replication fault detection system 300. In the spatial replication method, the code for a particular program may be executed two or more times, with each execution path using separate processor resources including functional units and registers.

As shown in FIG. 3, source code 201 for the program of interest is initially separated into computation segments 207 by compiler 202 based on a model wherein each segment takes a set of inputs, performs computations on the input values, and exposes a set of outputs to further computation. Each segment 207 is then compiled by compiler 202 to generate primary compiled code section 303, secondary compiled code section 305, and verification code 304, which are input to optimizer 205.

Optimizer 205 then generates primary and secondary copies 306 and 307 of code corresponding to code segments 303 and 305, ensuring that the primary and secondary copies are executed using different registers and functional units 206(1)/206(2) (as well as any other execution resources utilized by the program), respectively. An optimized copy 308 of verification code 304 is also generated by optimizer 205. Optimizer 205 may reorder the operations in copies 306/307 as long as it does not eliminate the primary or secondary operation in a pair, or cause them to be executed on the same resource or expose a result until the checking code has verified that the results are identical. As in the temporal replication case, the compiler divides code into segments so that checking is performed prior to the exposure of any results or transfers of control.

In an alternative embodiment, 'hints', such as tags, are provided to allow a computation domain to be associated with a set of execution and data resources that is disjoint from the resources used for other computation domains. Execution of different computation domains may be allowed to overlap. Compiler 202 generates a first code segment for the execution of each stage of program execution along with a second code segment for redundant computation and checking of the results, specifying a different computation domain for each segment.

For example, if in a stage of the execution of a program one needed to assign s=sin(a), compiler 202 may generate code such as the following:

ts=sin(a); in the first computation domain;
rs=sin(a); in the second computation domain; and
if if(ts<>rs) go to recovery routine;
[at this point s can be exposed for further computation]
s=ts;

Code is then generated for subsequent program stages. In the present embodiment, one computation domain uses a first set of execution units, e.g., functional units 102A-105A and registers in register group 106A, and the other computation domain uses a second set of execution units, e.g., functional units 102B-105B and registers in register group 106B.

'Hints' maybe given to the processor's execution unit scheduling logic by tagging groups of instructions with information that indicates the computation domain with which each group of instructions is associated. Hints may also be included in the compiled code to assure that the optimizer or hardware does not discard the duplicated operations.

Before the result of a computation is exposed, or used for further computation, checking of the redundant results is performed. Verification code 304 generated by compiler 202 is executed, as indicated by decision block 310, to compare the results of execution of primary and secondary code copies 306/307. This checking may also be performed in a computation domain different from those used in the actual computation. In the case that the results do not match, recovery actions can be attempted that are similar to those described with respect to FIG. 2 in the above section on temporal replication. Compiler 202 can make use of the explicit scheduling available in the instruction set of many VLIW processors to ensure that redundant pairs of code are not executed by the same functional units. If a discrepancy in results is found, appropriate recovery action is taken by error handling routine 320. This recovery action may include re-execution, failing, or trapping to software or operating system handlers.

The compiled code shown in Table 3 below is an example of the present method of spatial replication for performing the A+B=C operation shown in Table 1. As shown in Table 3, registers R1 and R11 are loaded with the value of A in clock cycle 1, and registers R2 and R12 are loaded with the value of B in clock cycle 2. Registers R1 and R2 are, for example, part of register group 106A and registers R11 and R12 are part of register group 106B. During clock cycle 3, registers R3 and R13 are used to sum the contents of registers R1/R2 and R11/R12, respectively.

Register R4 is then loaded with the stored value of 'C', and the result of the first addition operation is then compared by verification copy 304/308 in clock cycle 4 (step 310 in FIG. 3), against the result of the second addition operation. If the values stored in registers R3 and R13 are not equal, a branch to error handling routine 320 is taken, in cycle 5. During clock cycle 6, the sum stored in register R13 is stored in processor memory as 'C'. If the values stored in registers R3 and R13 match, then the values stored in registers 3 and 4 are compared, in clock cycle 7. Here, the value of an operand stored to memory is reloaded and its fetched value compared to that which was supposed to be stored. This is done to be sure that there was no error on the paths from the register to memory or in the memory controller. If the values stored in registers R3 and R4 are not equal, a branch to error handling routine 320 is taken in cycle 8, otherwise, processing continues with the next segment of code, at step 315.

The results of the two operations are checked before the results are 'exposed', or used to alter the further flow of execution of the program. Error handling routine 320 may provide for any combination of the following actions: retrying an erroneous operation a predetermined number of times; causing a fault, or taking other action in lieu of retrying the operation; error reporting; and statistics collection.

Each column of instructions in Table 3 is executed by a specific functional unit in processor 101, as well as by a specific group of registers, in either group 106A or 106B in the register file 107. Register file 107 is partitioned such that the same register resources are not used by the primary and secondary code copies 306/307.

two spatial domains and the results voted on to determine which result (i.e., the majority result, or consensus) is to be executed.

Figure 4:
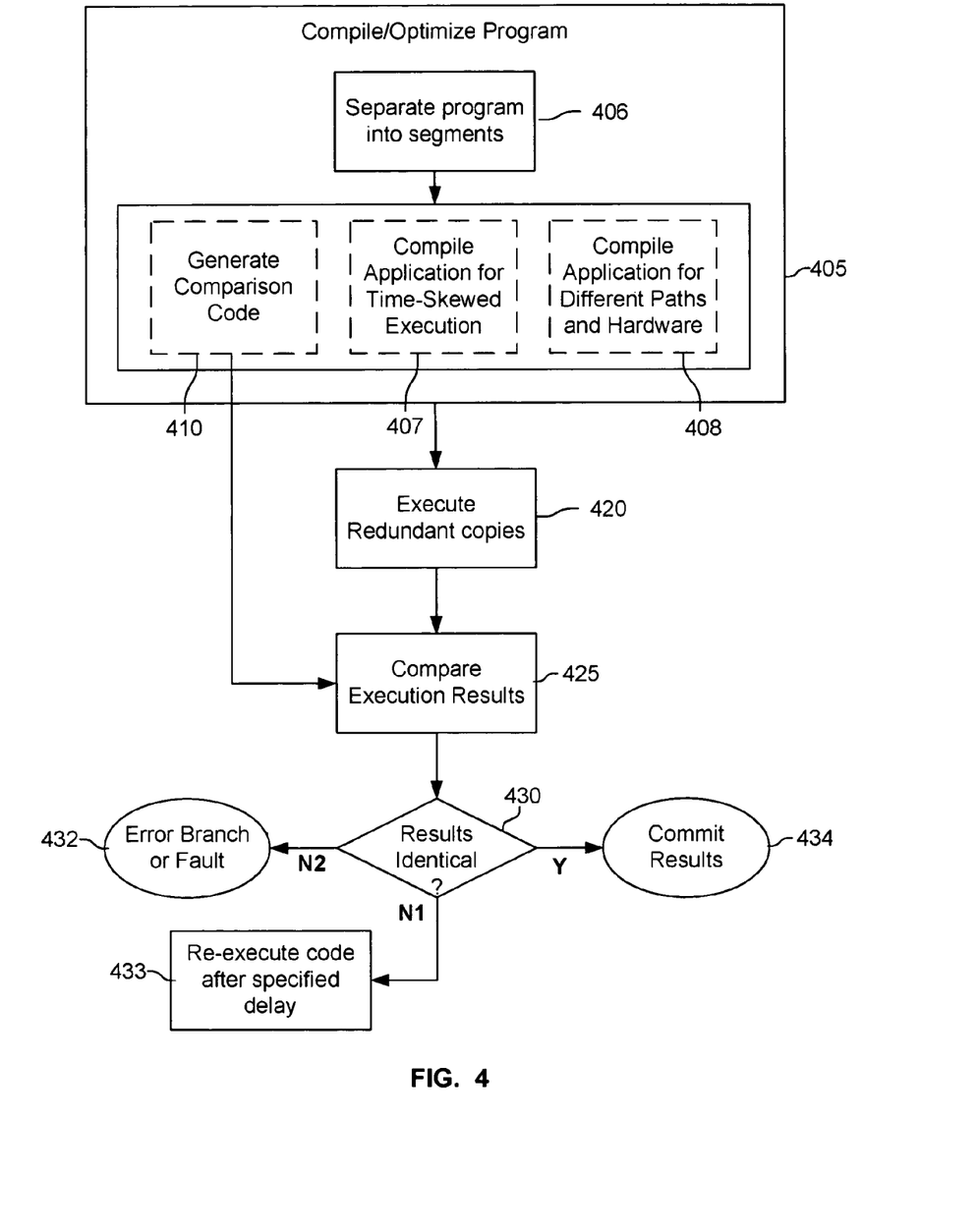
FIG. 4 is a flowchart illustrating exemplary steps performed during operation of the systems shown in FIGS. 2 and 3.

FIG. 4 is a flowchart illustrating exemplary steps performed during operation of the systems shown in FIGS. 2 and 3. As shown in FIG. 4, in step 405, source code for a program is first segmented into computation segments, at step 406, and then compiled and optimized in one of two forms. In either form, the resulting compiled object code will perform a redundant computation in a different computational domain from the domain performing the initial computation.

If the resultant compiled code is to be executed in a time-skewed manner (as described above with respect to FIG. 2), then at step 407, compiler 202 and optimizer 205 generate and schedule execution of two redundant code segments so that a minimum number of clock cycles will elapse between the execution of primary copy 210 and secondary copy 215 of a particular segment of the compiled source code.

TABLE 3

| | Primary units | | | Secondary Units | |
|---|---|---|---|---|---|
| Cycle | BRUnit | ALU/cmpU | Load/storeU | ALU/cmpU | Load/storeU |
| (1) | Nop | Nop | Load R1 = A | Nop | Load R11 = A |
| (2) | Nop | Nop | Load R2 = B | Nop | Load R12 = B |
| (3) | Nop | Nop | Add R3 = R1 + R2 | Nop | Add R13 = R11 + R12 | NoP |
| (4) | Nop | Nop | Nop | Comp R13, R3 | Nop |
| (5) | BNE Error | Nop | Nop | Store R13, C | Nop |
| (6) | Nop | Nop | Load R4 = C | Nop | Nop |
| (7) | Nop | Nop | Comp R4, R3 | Nop | Nop |
| (8) | BNE Error | Nop | Nop | Nop | Nop |
| | Label Error: // Error and retry handling routine | | | | |

Note that optimizer 205 may schedule subsequent operations into some of the Nop spots in the code shown above. As shown in the example in Table 3, duplicated code using different result registers allows comparison of results to determine if there was an error in the functional units, registers, or on the paths between them. The same is true of compare operations as well.

In an alternative embodiment, the target address or label of a branch (or other change of control operation) may be loaded into a register so that a determination can be made as to whether the change of control was correctly executed, by comparing the value stored in the register with a literal value of the address associated with the label to which the branch was taken. The value stored and compared need not be the address but a value that is sufficiently unique to the label or entry point such that it is unlikely that an errant branch would take control with an identically encoded label or entry point.

In a further alternative embodiment, parameters in procedure and system calls may be duplicated, including passing a redundant return address or command code. Similarly, duplicated results may be returned. These techniques help ensure that the parameters to, and results from, a called routine are correct.

If the host system does not have adequate error detection and correction for memory and the paths to and from memory, two separate data regions, as represented by primary and secondary code copies 306/307, may also be maintained. Data is fetched from the redundant areas and compared to assure the fidelity of the data.

In an alternative embodiment, rather than comparing the results of two spatially distinct computations and branching to an error handling routine, or re-executing the code, the code for a particular program may be executed in more than If the compiled code is to be executed via different hardware entities, then at step 408, compiler 202/optimizer 205 generate essentially redundant primary and secondary copies 306 and 307 of a particular segment of code, ensuring that the primary and secondary copies use different registers and functional units 206(1)/206(2). These two copies are said to be essentially redundant because, although the two copies are functionally identical and perform the same computation(s), the two copies are not strictly identical, since different registers and functional units are employed in the execution of each copy. It is to be noted that In either of the above cases (described in steps 407 and 408), compiler 202 may be configured to perform the additional functions of optimizer 205, as described herein.

Verification code is generated by compiler 202 at step 410, during compilation of the corresponding code segment. At step 420, the redundant copies of a compiled code segment are executed by processor 101. The verification code generated in step 407 is executed at step 425 to compare the respective results of execution of primary and secondary copies 306/307. At decision block 430, if a discrepancy in results is found, appropriate action is taken by the appropriate error handling routine 230/320. This error recovery action may include re-execution (N1—step 433), or failing or trapping (N2—step 432) to software or operating system handlers. If the respective results of execution of primary and secondary copies 306/307 are identical, then at step 434 the results are committed, and redundant copies of the next segment of code are executed, at step 420.

In an alternative embodiment, the verification code itself generated by the compiler may be constructed so that verification is executed redundantly in multiple computation domains.

The above-described operations can be implemented in a standard compiler, or in a tool that dynamically translates code to native machine code or object format such as is done in 'just in time' (JIT) compilers. In another implementation or tool, software that performs static or dynamic code reorganization or optimization may be employed to dynamically translate legacy code into a redundant form, or incrementally translate existing code, in accordance with the present method. A design compliant with the present system may use all or some of the techniques above as determined by the amount of protection that is desired, as well as the performance requirements of the code, and as appropriate to augment whatever error detection mechanisms are built into the relevant hardware.

Instructions that perform the operations described with respect to FIGS. 2-4 may be stored on computer-readable storage media. These instructions may be retrieved and executed by a processor, such as processor 101 of FIG. 1, to direct the processor to operate in accordance with the present system. The instructions may also be stored in firmware. Examples of storage media include memory devices, tapes, disks, integrated circuits, and servers.

Certain changes may be made in the above methods and systems without departing from the scope of the present system. It is to be noted that all matter contained in the above description or shown in the accompanying drawings is to be interpreted as illustrative and not in a limiting sense. For example, the processor shown in FIG. 1 may be constructed to include components other than those shown therein, and the components may be arranged in other configurations. The elements and steps shown in FIGS. 2-4 may also be modified in accordance with the methods described herein, without departing from the spirit of the system thus described.

What is claimed is:

1. A method for detecting computational errors in a system comprising a digital processor executing a program, the method comprising steps of:
    separating the program in computation segments;
    compiling source code for at least one of the segments to generate two code sections, one of which is functionally redundant with respect to the other; and
    generating comparison code for comparing results produced by execution of the two code sections;
    wherein the processor is configured to:
    execute each of the code sections in a different computational domain to generate respective results;
    compare the respective results using the comparison code to detect said computational errors; and
    execute one of the code sections to alter further flow of execution of the program only if the respective results are identical.

2. The method of claim 1, wherein said computational domain comprises a time domain.

3. The method of claim 1, wherein the compiling step includes compiling the source code to schedule execution thereof so that a minimum number of processor clock cycles elapse between execution of a first one of the code sections and execution of the other one of the code sections.

4. The method of claim 3, wherein said minimum number of processor clock cycles is predetermined as a function of statistical properties of duration of disruptive events causing said computational errors.

5. The method of claim 1, wherein said computational domain comprises a spatial domain.

6. The method of claim 1, wherein the compiling step includes compiling the source code such that each of the code sections is executed using separate resources of the processor.

7. The method of claim 6, wherein said resources comprise functional units and partitioned registers.

8. The method of claim 7, wherein the partitioned registers are used to effect the detection and repair of errors in the registers and paths to/from the registers.

9. The method of claim 6, wherein the partitioned registers are utilized by encoding register names from a first set of registers into instructions in a first one of the code sections and encoding register names from a second set of registers into instructions in the other one of the code sections.

10. The method of claim 1, wherein the respective results are compared by executing the comparison code in a different computational domain from the domain in which one of the code sections was executed.

11. The method of claim 1, wherein the compiler uses an explicit scheduling aspect of the processor's instruction set to ensure that the two code sections are each executed by a different set of functional units.

12. The method of claim 1, including performing error handling if a discrepancy between the respective results is found.

13. The method of claim 12, wherein said error handling includes at least one function selected from the group consisting of re-execution, failing, and trapping to an error handling routine.

14. The method of claim 1, wherein each of the computation segments receives a set of inputs, performs at least one computation on the input values, and exposes a set of outputs to further computation.

15. The method of claim 1, including the step of optimizing one of the two code sections to execute via different registers and functional units than the other one of the code sections.

16. The method of claim 1, wherein the compiling step employs code reorganization to dynamically translate the source code into the two code sections.

17. The method of claim 1, wherein the step of compiling the source code is performed by incrementally translating the source code.

18. A system for detecting computational errors in a digital processor executing a program, the system comprising a compiler executing on a processor configured to:
    separate the program into computation segments;
    compile source code for at least one of the computation segments to generate output comprising two redundant code sections, each of which is configured to execute in a different computational domain; and generate comparison code for
    comparing respective results produced by execution of the two code sections;
    indicate that one of said computational errors has been detected when the respective results are different.

19. The system of claim 18, wherein the processor:
    executes each of the code sections in a different computational domain to generate respective results for each of the code sections;
    compares the respective results using the comparison code; and
    performs error handling, if a discrepancy between the respective results is found.

20. The system of claim 19, wherein the respective results are compared by executing the comparison code in a different computational domain from the domain in which one of the code sections was executed.

21. The system of claim 19, wherein the error handling includes at least one function selected from the group consisting of re-execution, failing, and trapping to an error handling routine.

22. The system of claim 18, including an optimizer for modifying the output of the compiler to schedule execution of the redundant code sections so that a minimum number of clock cycles elapse between execution of a first one of the sections and execution of the other one of the code sections.

23. The system of claim 18, including an optimizer for configuring one of the redundant code sections to execute via different registers and functional units than the other one of the code sections.

24. The system of claim 18, wherein the source code is compiled to schedule execution of the redundant code sections so that a minimum number of processor clock cycles elapse between execution of a first one of the code sections and execution of the other one of the code sections.

25. The system of claim 24, wherein said minimum number of processor clock cycles is predetermined as a function of statistical properties of the duration of disruptive events causing said computational errors.

26. The system of claim 18, wherein the compiler compiles the source code such that each of the code sections is executed using a different set of functional units and partitioned registers of the processor.

27. The system of claim 26, wherein the partitioned registers are used to effect the detection and repair of errors in the registers and paths to/from the registers.

28. The system of claim 26, wherein the partitioned registers are utilized by encoding register names from a first set of registers into instructions in a first one of the code sections and encoding register names from a second set of registers into instructions in the other one of the code sections.

29. The system of claim 18, wherein the compiler uses an explicit scheduling aspect of the processor's instruction set to ensure that the two code sections are not executed by the same functional units.

30. The system of claim 18, wherein the processor:
   executes each of the code sections in a different computational domain to generate respective results for each of the code sections;
   compares the respective results using the comparison code; and
   executes one of the code sections to alter further flow of execution of the program only if the respective results are identical.

31. A system for detecting computational errors in a digital processor executing a program, the system comprising;
   means for compiling source code for at least part of the program to generate two code sections, one of which is functionally redundant with respect to the other;
   means for generating comparison code for comparing results produced by execution of the two code sections; wherein each of the code sections is executed by the processor in a different computational domain to generate respective results;
   means for comparing the respective results using the comparison code to detect said computational errors; and
   means for performing error handling, if a discrepancy between the respective results is found.

32. The system of claim 31, wherein the source code is compiled to schedule execution thereof so that a minimum number of processor clock cycles elapse between execution of a first one of the code sections and execution of the other one of the code sections.

33. The system of claim 31, wherein the source code is compiled such that each of the code sections is executed using a different set of functional units and partitioned registers of the processor.

34. Computer product code in a system comprising instructions, stored on a computer-readable storage media, wherein the instructions, when executed by a digital processor, perform steps for detecting computational errors in a the digital processor executing a program, comprising:
   compiling source code for at least part of the program to generate two code sections, one of which is functionally redundant with respect to the other;
   generating comparison code for comparing results produced by execution of the two code sections;
   wherein the processor is configured to: execute each of the code sections in a different computational domain to generate respective results; compare the respective results using the comparison code to detect said computational errors; an perform error handling, if a discrepancy between the respective results is found.

35. The software product of claim 34, wherein said computational domain comprises a time domain.

36. The software product of claim 34, wherein said computational domain comprises a spatial domain.

* * * * *

UNITED STATES PATENT AND TRADEMARK OFFICE
CERTIFICATE OF CORRECTION

PATENT NO.         : 7,584,405 B2                                   Page 1 of 1
APPLICATION NO.    : 10/726976
DATED              : September 1, 2009
INVENTOR(S)        : Benjamin Daniel Osecky et al.

It is certified that error appears in the above-identified patent and that said Letters Patent is hereby corrected as shown below:

In column 11, line 38, in Claim 1, delete "in" and insert -- into --, therefor.

In column 12, lines 46-47, in Claim 18, after "domain;" delete "and generate comparison code for".

In column 12, line 48, in Claim 18, before "comparing" insert -- generate comparison code for --.

In column 12, line 49, in Claim 18, after "sections;" insert -- and --.

In column 14, line 2, in Claim 31, delete "comprising;" and insert -- comprising: --, therefor.

In column 14, line 27, in Claim 34, after "in" delete "a".

In column 14, line 38, in Claim 34, delete "an" and insert -- and --, therefor.

Signed and Sealed this

Third Day of August, 2010

David J. Kappos
*Director of the United States Patent and Trademark Office*